(12) United States Patent
Chebiyyam et al.

(10) Patent No.: US 11,606,659 B2
(45) Date of Patent: Mar. 14, 2023

(54) ADAPTIVE CROSS-CORRELATION

(71) Applicant: Zoox, Inc., Foster City, CA (US)

(72) Inventors: Venkata Subrahmanyam Chandra Sekhar Chebiyyam, San Francisco, CA (US); Turhan Karadeniz, Oakland, CA (US); Nam Gook Cho, Cupertino, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/216,491

(22) Filed: Mar. 29, 2021

(65) Prior Publication Data
US 2022/0312138 A1 Sep. 29, 2022

(51) Int. Cl.
*H04R 29/00* (2006.01)
*H04R 1/32* (2006.01)
*H04R 3/00* (2006.01)

(52) U.S. Cl.
CPC ........... *H04R 29/008* (2013.01); *H04R 1/326* (2013.01); *H04R 3/005* (2013.01)

(58) Field of Classification Search
CPC .... H04R 1/326; H04R 3/005; H04R 2430/21; H04R 29/008
USPC ................. 381/56, 58, 91, 92, 124
See application file for complete search history.

(56) References Cited

U.S. PATENT DOCUMENTS

| | | | | |
|---|---|---|---|---|
| 2015/0117652 A1* | 4/2015 | Sato | ...................... | G10K 11/002 381/56 |
| 2018/0350391 A1 | 12/2018 | Moore et al. | | |
| 2019/0164567 A1* | 5/2019 | Liu | ........................ | H04R 3/005 |
| 2019/0294169 A1 | 9/2019 | Shabtai et al. | | |
| 2019/0313187 A1* | 10/2019 | Stoltze | ................ | G10L 21/0232 |
| 2019/0377056 A1 | 12/2019 | Dudyala et al. | | |
| 2020/0213728 A1 | 7/2020 | Lopatka et al. | | |
| 2020/0286495 A1* | 9/2020 | Norvell | ............... | G10L 21/0308 |

FOREIGN PATENT DOCUMENTS

KR 101812159 B1 12/2017

OTHER PUBLICATIONS

The International Search Report and Written Opinion for PCT Application No. PCT/US22/20133, dated Jun. 22, 2022, 11 Pages.
"Time Delay of Arrival Estimation," retrieved on Apr. 15, 2021 at <<http://www.xavieranguera.com/phdthesis/node40.html>>, 3 pages.

* cited by examiner

*Primary Examiner* — William A Jerez Lora
(74) *Attorney, Agent, or Firm* — Lee & Hayes, P.C.

(57) ABSTRACT

Techniques for adaptive cross-correlation are discussed. A first signal is received from a first audio sensor associated with a vehicle and a second signal is received from a second audio sensor associated with the vehicle. Techniques may include determining, based at least in part on the first signal, a first transformed signal in a frequency domain. Additionally, the techniques include determining, based at least in part on the second signal, a second transformed signal in the frequency domain. A parameter can be determined based at least in part on a characteristic associated with at least one of the vehicle, an environment proximate the vehicle, or one or more of the first or second signal. Cross-correlation data can be determined based at least in part on one or more of the first transformed signal, the second transformed signal, or the parameter.

21 Claims, 6 Drawing Sheets

ADAPTIVE CROSS-CORRELATION

BACKGROUND

A vehicle can use audio sensors to capture audio data related to vehicles, pedestrians, and other objects in an environment proximate the vehicle. Some vehicles may capture audio data from multiple audio sensors associated with the vehicle. Various techniques may correlate audio data from multiple audio sensors to estimate a location of a sound source. It is important for vehicles to use the captured audio data to identify objects that may necessitate changes to the operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to techniques for estimating a direction of arrival of a sound in an environment. In some examples, audio data may be received from audio sensors associated with a vehicle. The vehicle may be an autonomous vehicle with multiple audio sensors that capture sounds in an environment in which the vehicle is located. In some examples, pairs of audio sensors (either separated spatially or temporally from one another) associated with a vehicle generate audio data that may be used to determine a direction of arrival (DoA) estimate of an audio event. Audio events may include, for example, emergency vehicle sirens, vehicle horns, engine sounds, tire noise, music, human speech, dog barking, and the like. In turn, such audio events may be used to inform the vehicle how to proceed safely.

In some examples, a computing device may receive a first signal from a first audio sensor associated with a vehicle and receive a second signal from a second audio sensor associated with the vehicle. The computing device may transform the first signal to a transformed first signal in a frequency domain and transform the second signal to a transformed second signal in the frequency domain. The computing device may then multiply the transformed first signal and the transformed second signal to generate a multiplied factor. The multiplied factor may be divided by a magnitude of the multiplied factor to generate a result. In some examples, the magnitude of the multiplied factor is determined by a parameter. The computing device may transform the result to the time domain to generate a cross-correlation between the first signal and the second signal.

In some examples, the computing device may also determine, based at least in part on the cross-correlation between the first signal and the second signal, a direction of arrival value associated with the first signal and the second signal. In some examples, the computing device may determine the parameter based on at least one of a frequency sparseness of at least one of the transformed first signal or the transformed second signal, environmental noise proximate the vehicle, a window size associated with at least one of the first signal or the second signal, a fundamental frequency value associated with at least one of the first signal or the second signal, or a signal-to-noise ratio of the first and second signals.

In some examples, a computing device may receive a first signal in a time domain from a first audio sensor associated with a first pair of audio sensors associated with a vehicle. The computing device may further receive a second signal in the time domain from a second audio sensor associated with the first pair of audio sensors associated with the vehicle. A Fourier transform may be applied to the first signal to generate a transformed first signal in a frequency domain. Additionally, a Fourier transform may be applied to the second signal to generate a transformed second signal in the frequency domain. In some examples, the computing device may perform pre-processing of the transformed first signal and the transformed second signal. After pre-processing, the computing device may further multiply the transformed first signal and the transformed second signal to generate a multiplied factor. The computing device may then select a value for the parameter and divide the multiplied factor by a magnitude of the multiplied factor, where the magnitude of the multiplied factor is determined by the parameter. In some examples, the computing device applies an inverse Fourier transform to the result to generate a cross-correlation between the first signal and the second signal. Based at least in part on the cross-correlation data, the computing device may determine a direction of arrival associated with the first signal and the second signal. In some examples, the computing device may initiate an activity based on the direction of arrival.

The techniques discussed herein can improve the functioning of a vehicle by supporting tuning of a new cross-correlation phase transformation algorithm. As discussed herein, the new cross-correlation phase transformation algorithm may allow a vehicle's systems and methods to more accurately identify an audio event and determine a direction of arrival of the audio event with respect to the vehicle in a variety of different environments and noise situations. Based on the direction of arrival, the vehicle may take an appropriate action, such as moving toward the audio event, moving away from the audio event, or taking some other action. For example, the vehicle may take action to avoid an emergency vehicle, an object, or other hazard to protect the occupants of the vehicle, objects near the vehicle, occupants of other vehicles, and the like.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using audio data. Additionally, the techniques described herein can be used with real data (e.g., captured using sensor(s)), simulated data (e.g., generated by a simulator), or any combination of the two.

Figure 1:
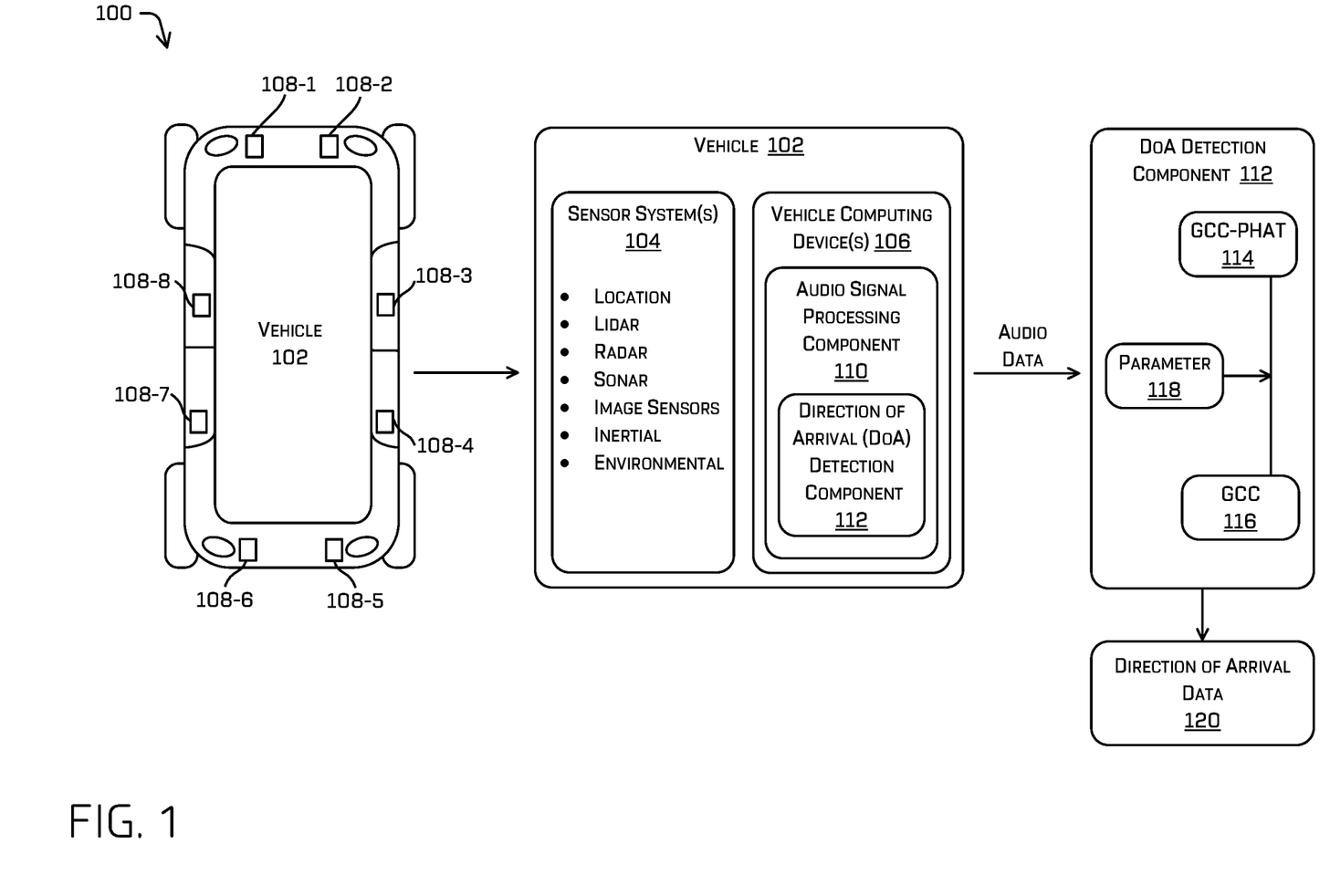
FIG. 1 is a schematic diagram illustrating an example implementation to estimate a direction of arrival of an audio event received by audio sensors associated with an autonomous vehicle, in accordance with examples of the disclosure.

FIG. 1 is a schematic diagram illustrating an example implementation 100 to estimate a direction of arrival of an audio event received by audio sensors associated with an autonomous vehicle, in accordance with examples of the disclosure. As illustrated in FIG. 1, a vehicle 102 may include any number of audio sensors (e.g., 108-1, 108-2, 108-3, 108-4, 108-5, 108-6, 108-7, and 108-8) that generate audio data representing sounds and audio events in an environment. The sounds and audio events may include, for example, emergency vehicle sirens, vehicle horns, engine sounds, tire noise, music, human speech, dog barking, and other sounds proximate the vehicle 102. Of course, though the pairs are depicted as spatially separated for illustrative purposes, the techniques described herein are equally applicable to a first audio signal acquired at a first time and a second audio signal acquired at a second time.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details regarding the vehicle 102 are described herein.

In one example, the vehicle 102 includes multiple audio sensors 108 disposed at different locations on the vehicle 102. Although eight audio sensors are shown in FIG. 1, other examples may include any number of audio sensors associated with the vehicle 102. In some examples, the multiple audio sensors 108 are positioned and oriented to capture sounds and audio events from different regions of the environment proximate the vehicle 102. For example, different audio sensors may capture sounds from the environment ahead of the vehicle 102, behind the vehicle 102, on both sides of the vehicle 102, and the like. In some implementations, all audio sensors are capturing sounds simultaneously and may be using at least a portion of the captured sounds to navigate the vehicle 102 through the environment.

In the example of FIG. 1, the multiple audio sensors 108 may be grouped into pairs, as discussed herein. For example, audio sensors 108-1 and 108-2 may be grouped into a first pair and audio sensors 108-3 and 108-4 may be grouped into a second pair. At least as illustrated in FIG. 1, each pair of audio sensors is oriented along a different axis. The systems and methods discussed herein determine the direction of arrival (DoA) of sounds at one or more audio sensors 108.

In addition to the audio sensors 108, the vehicle 102 can be associated with other sensor system(s) 104 that may be disposed on the vehicle 102. For example, the sensor system(s) 104 can include location sensors (e.g., global positioning system (GPS), compass, etc.), light detection and ranging (lidar) sensors, radio detection and ranging (radar) sensors, sound navigation and ranging (sonar) sensors, image sensors (e.g., cameras), inertial sensors (e.g., inertial measurement units, accelerometers, magnetometers, gyroscopes, etc.), environmental sensors (e.g., temperature sensors, humidity sensors, light sensors, pressure sensors, etc.), and the like. In some examples, audio sensors 108 may be any type of sensor that captures various sound data in an environment proximate the vehicle 102. The sensor system(s) 104 can generate sensor data, which may be utilized by vehicle computing device(s) 106 associated with the vehicle 102.

In at least one example, the vehicle computing device(s) 106 may receive and process audio data received from the multiple audio sensors 108. The received audio data may include any sound captured from the environment in which the vehicle 102 is operating.

In some examples, the vehicle computing device(s) 106 of the vehicle 102 may include an audio signal processing component 110 that processes the audio data or audio signal representing the sound in an environment. The audio signal processing component 110 may include a direction of arrival (DoA) detection component 112. The DoA detection component 112 may receive the audio data representing sound from the environment from the audio sensor(s) 108. As discussed herein, the DoA detection component 112 may select one or more audio sensor pairs from the above-noted audio sensors 108. In some examples, the DoA detection component 112 may estimate an angular spectrum of the audio sensor pair based at least in part on the audio data. In some examples, the DoA detection component 112 may use a cross-correlation algorithm to estimate the angular spectrum of the audio sensor pair, although other techniques may be used.

In particular examples, the DoA detection component 112 may apply a generalized cross-correlation (GCC) algorithm 116, a generalized cross-correlation algorithm with phase transform (GCC-PHAT) 114, or a new generalized cross-correlation algorithm (GCC-NEW) that may resemble portions of the GCC algorithm 116 and/or the GCC-PHAT algorithm 114. In some examples, the GCC algorithm 116 is defined by the equation:

$$\text{GCC\_FFT}(f) = \frac{S_1(f) * S_2(f)^*}{(|S_1(f)| * |S_s(f)|)^0}$$

In some examples, the GCC-PHAT algorithm 114 is defined by the equation:

$$\text{GCC\_PHAT\_FFT}(f) = \frac{S_1(f) * S_2(f)^*}{(|S_1(f)| * |S_2(f)|)^1}$$

In some examples, the GCC-NEW algorithm is defined by the equation:

$$\text{GCC\_NEW}(f, p) = \frac{S_1(f) * S_2(f)^*}{(|S_1(f) * S_2(f)|)^p}.$$

Where, p belongs to [0,1]

As shown in FIG. 1, a parameter 118 corresponds to parameter p shown in the GCC-NEW algorithm. The value of parameter 118 can be adjusted to change the cross-correlation phase transformation associated with multiple audio signals for estimating a DoA of an audio event.

When using the GCC-NEW algorithm, the parameter 118 may determine the extent to which the denominator is applied in the equation. Based on the value of the parameter 118, the operation of the GCC-NEW algorithm may range from being similar to the GCC algorithm 116 (when p=0) and being similar to the GCC-PHAT algorithm 114 (when p=1). In some examples, the GCC-NEW algorithm is not similar to the GCC algorithm 116 or the GCC-PHAT algorithm 114. Additional details regarding the GCC-NEW algorithm are discussed herein. In some examples, the output of the DoA detection component 112 may generate direction of arrival data 120.

The GCC algorithm 116 and the GCC-PHAT algorithm 114 may have different advantages and disadvantages for processing different types of signals. As discussed in greater detail herein, the parameter 118 modifies an exponent in the denominator of the GCC-NEW algorithm to adjust the algorithm to perform a pure GCC algorithm 116, a pure GCC-PHAT algorithm 114, or a new operation that is different from the GCC algorithm 116 and the GCC-PHAT algorithm 114.

An example of the GCC-NEW algorithm changes the value of the algorithm denominator based on the value of parameter p. In some examples, by changing the parameter p, the GCC-NEW algorithm can vary from the GCC-PHAT algorithm 114 to the GCC algorithm 116.

In some examples, the GCC-PHAT algorithm 114 includes two time domain signals ($S_1$ and $S_2$) in the numerator. $S_1$ and $S_2$ are multiplied to create a multiplied factor. Further, the denominator of the GCC-PHAT algorithm 114 includes the multiplication of the magnitude of the multiplied factor.

In some examples, the GCC algorithm 116 has the same numerator as the GCC-PHAT algorithm 114. As shown in the equation above, the denominator of the GCC algorithm 116 is raised to the power of 0, which results in a value of 1 for the denominator. In this example, the GCC algorithm 116 is simplified to the value of the numerator since it is divided by 1.

In some examples, the GCC-NEW algorithm includes parameter p as an exponent in the denominator of the equation. The value of parameter p can vary from 0 to 1 to adjust the impact of the denominator in the GCC-NEW algorithm. When parameter p is near 0, the GCC-NEW algorithm operates similar to the GCC algorithm 116. As p increases toward 1, the GCC-NEW algorithm begins to operate more like the GCC-PHAT algorithm 114 due to the increasing value of exponent p in the denominator of the GCC-NEW algorithm.

In some examples, the value of parameter p is adjusted (e.g., tuned) to determine a balance between the GCC-PHAT algorithm 114 and the GCC algorithm 116. For example, the value of parameter p may be determined based on the type of signals being processed and knowledge of the strengths and weaknesses of the GCC-PHAT algorithm 114 and the GCC algorithm 116. In some examples, the GCC-PHAT algorithm 114 has sharp cross-correlation peaks, which can provide more accurate time delay of arrival (TDoA) estimates. In other examples, if the input signals are periodic, the GCC algorithm 116 may produce results that are periodic. Thus, in situations with periodic input signals, it may be advantageous to use the GCC-PHAT algorithm 114 which is less likely to produce periodic results. In these situations, the parameter p may be set closer to 1 to obtain the advantages of the GCC-PHAT algorithm 114.

In particular examples, the GCC-PHAT algorithm 114 may be sensitive to noise. Additionally, the GCC-PHAT algorithm 114 may not produce meaningful results when the input signals are sparse in the frequency domain. Thus, in situations with significant noise or input signals that are sparse in the frequency domain, it may be beneficial to use the GCC algorithm 116. In these situations, the parameter p may be set closer to 0 to obtain the advantages of the GCC algorithm 116.

In some examples, the parameter p may be adjusted based on the specific sounds of interest, such as emergency vehicle sounds. Additionally, specific examples may apply time domain windowing to multiple audio signals by associating a particular window size with the audio signals.

In particular examples, the value of parameter p may be determined based on one or more characteristics of the audio signal captured by audio sensors 108. For example, the value of parameter p may be adjusted based on one or more of:

1. A signal-to-noise ratio of the audio signal.
2. A width of the peak of the GCC algorithm output.
3. A frequency sparseness of the transformed audio signal.
4. Environmental noise near the vehicle (e.g., wind noise and other objects generating noise in the environment near the vehicle).
5. A window size associated with the audio signal.
6. A fundamental frequency of the audio signal.

In some examples, a different value of parameter p may be assigned to each pair of audio sensors 108. Since the multiple audio sensors 108 are positioned at different locations on the vehicle 102, the audio sensors 108 may detect different sounds or detect the same sounds with different intensities. Thus, the value of parameter p may be selected for each pair of audio sensors 108 based on the specific audio signals generated by the pair of audio sensors 108. In some examples, a machine learned model can be trained to select a value of parameter p based on an analysis of a first few frames of audio data, pre-analysis of a window of audio data, and the like. Additional details regarding selecting a value of parameter p are discussed herein and may be implemented using a machine learned model.

In some examples, as a window size increases (e.g., a longer period of time associated with the window), a smaller value of parameter p may provide an increased DoA accuracy.

In particular examples, the value of parameter p can be dynamic such that the parameter p is continually adjusted based on changes to the received audio signals. For example, the described systems and methods may include a machine learning feedback loop that regularly tunes, adjusts, or otherwise changes the value of parameter p in response to changes in the audio signals being processed. In some examples, one or more of the audio signals or the transformed signals are provided to a machine learned model, which generates the parameter p.

In some examples, the systems and methods described herein may apply multiple values of parameter p to the received audio signals simultaneously. For example, the systems and methods may apply four different values of parameter p to the received audio signals and analyze the results produced by each parameter value, although any number of values of the parameter p may be used. In some situations, the parameter p that produces a result with the highest confidence level is selected for processing the current audio data and may be used for processing subsequent audio signals.

In particular examples, the described systems and methods may aggregate the performance of different values of parameter p over multiple time windows. For example, a particular value of parameter p may vary over time, but is the most consistent. In this example, the most consistent parameter p may be selected for use in processing the audio signals.

Figure 2:
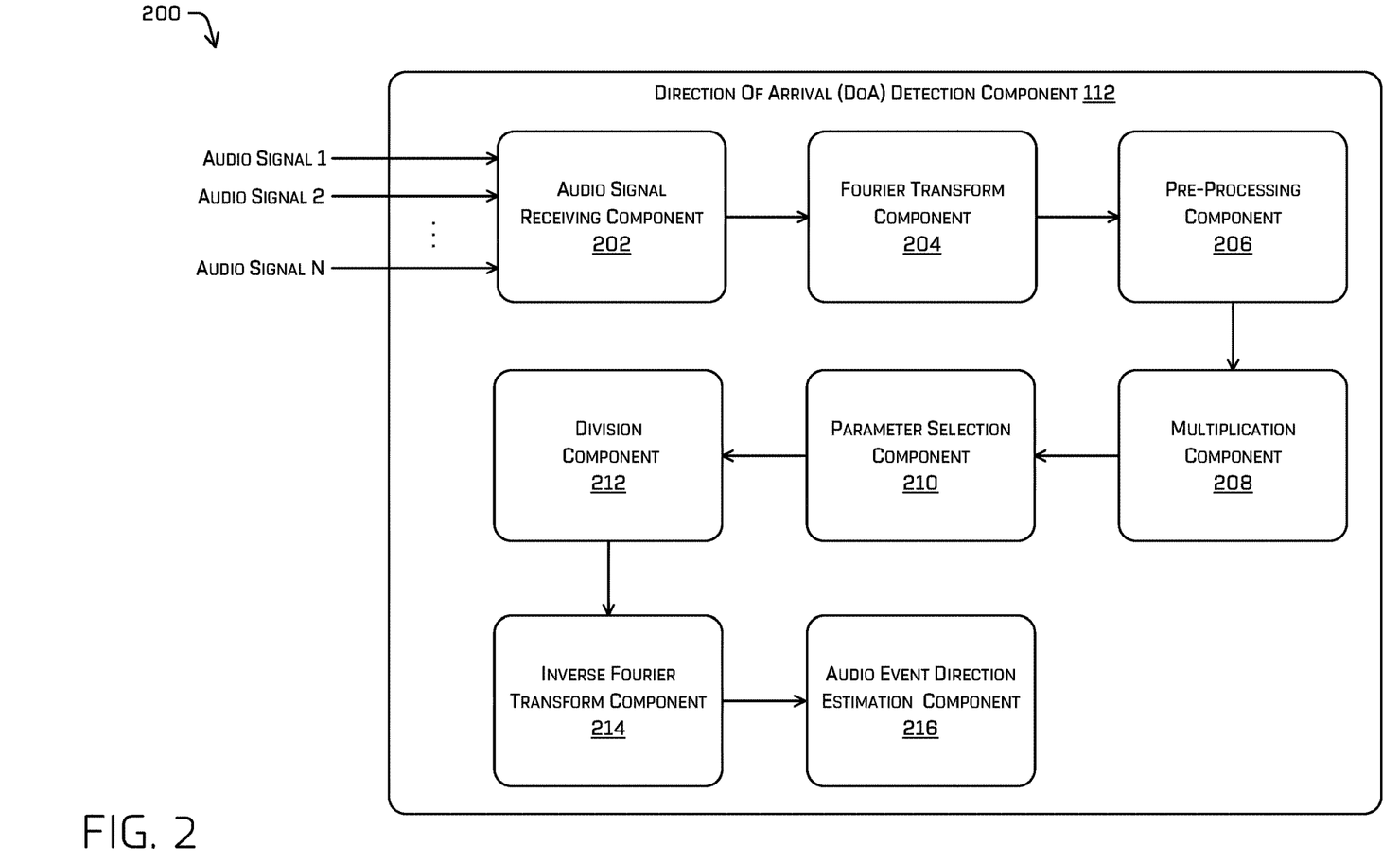
FIG. 2 is an illustration of an example process for estimating a direction of arrival of an audio event based on audio data received from multiple audio sensors associated with the vehicle, in accordance with examples of the disclosure.

FIG. 2 is an illustration of an example process 200 for estimating a direction of arrival of an audio event based on audio data received from multiple audio sensors 108 associated with the vehicle 102, in accordance with examples of the disclosure. The operations described herein with respect to the process 200 may be performed by the direction of arrival detection component 112.

An audio signal receiving component 202 receives audio data from one or more audio sensors, such as audio sensors 108 shown in FIG. 1. The received audio signals are provided to a Fourier transform component 204, which performs a Fourier transform on the received audio signals to generate transformed audio signals in a frequency domain.

A pre-processing component 206 performs various pre-processing activities to the transformed audio signals. As discussed herein, the pre-processing activities may include filtering out particular sound frequencies that are not of interest, extracting a signal-to-noise ratio, and assigning signals to specific frequency bins. The output from the pre-processing component 206 is provided to a multiplication component 208 that multiplies two of the transformed (and pre-processed) audio signals to generate a multiplied factor.

The multiplication component 208 provides the multiplied factor to a parameter selection component 210, which selects a value for parameter 118. As discussed herein, the value for parameter 118 may be selected based on a frequency sparseness of at least one of the transformed audio signals, environmental noise near the vehicle, a window size associated with at least one of the audio signals, a fundamental frequency value associated with at least one of the audio signals, or a signal-to-noise ratio of the audio signals. As discussed herein, the value for parameter 118 may be determined using a machine learned model. In some examples, an initial value of parameter 118 may be selected based on a planned driving route (e.g., expected noise level along the planned driving route, time of day, and the like). The value of parameter 118 may be adjusted at any time based on changing noise levels and other factors, as discussed herein. A division component 212 uses the selected value for parameter 118 to adjust a denominator in the GCC algorithm. As discussed herein, adjusting the denominator of the GCC algorithm allows the algorithm to be positioned anywhere between the GCC algorithm 116 and the GCC-PHAT algorithm 114.

The output of the division component 212 (e.g., the results of the division operation) is provided to an inverse Fourier transform component 214. Applying an inverse Fourier transform to the output of the division component 212 generates a cross-correlation of the two signals in the time domain. An audio event direction component 216 generates a DoA associated with the two signals based at least in part on the cross-correlation of the two signals in the time domain.

Example systems and methods for using DoA data are discussed in U.S. patent application Ser. No. 16/661,898 titled "Emergency Vehicle Detection" and filed Oct. 23, 2019, U.S. patent application Ser. No. 16/836,605 titled "Distinguishing Between Direct Sounds And Reflected Sounds In An Environment" and filed Mar. 31, 2020, and U.S. patent application Ser. No. 16/836,632 titled "Detecting Occluded Objects Using Sound" and filed Mar. 31, 2020, the entirety of all of which are herein incorporated by reference, for all purposes.

Figure 3:
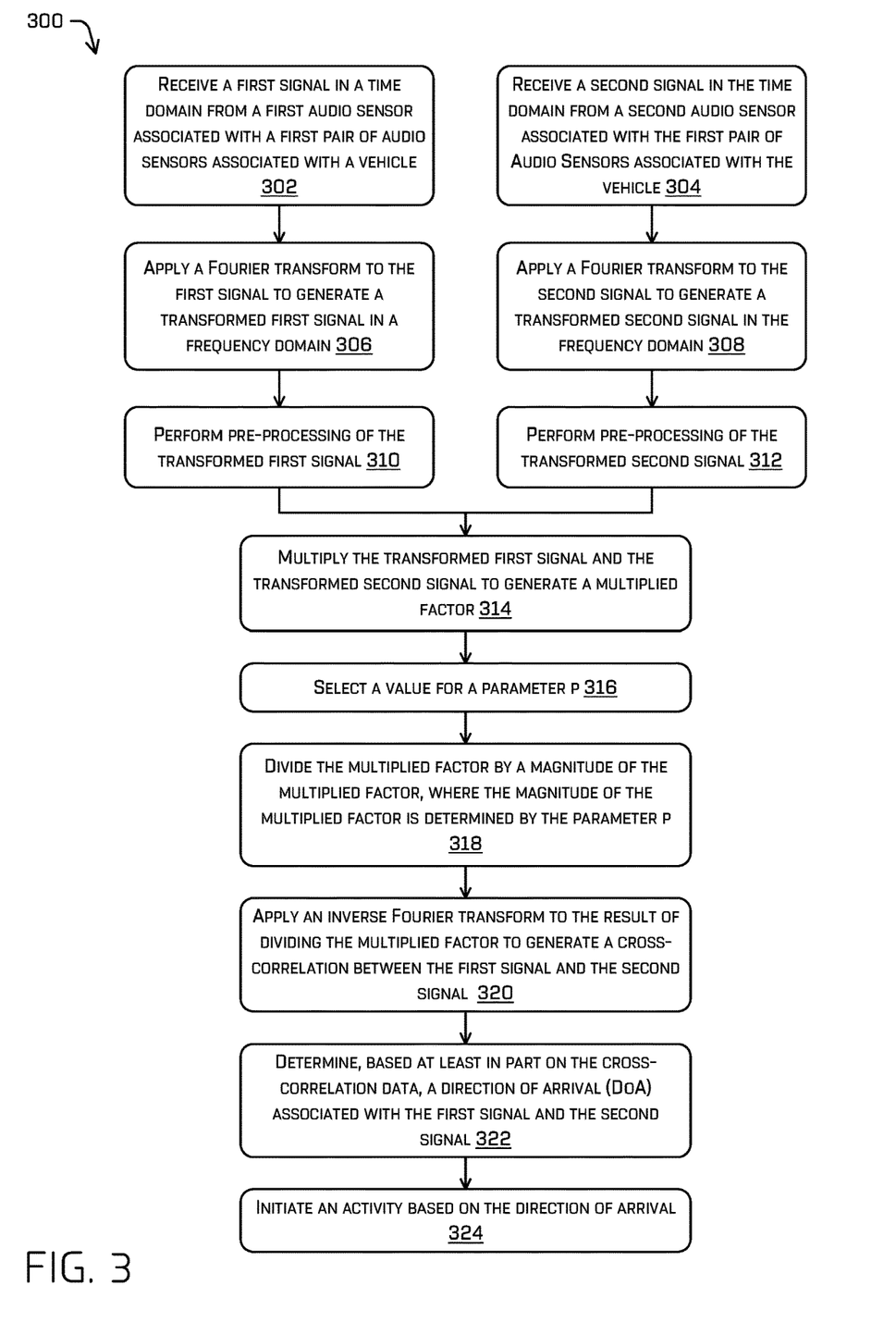
FIG. 3 illustrates an example process for estimating a direction of arrival of an audio event based on a cross-correlation of multiple audio signals, in accordance with examples of the disclosure.

FIG. 3 illustrates an example process 300 for estimating a direction of arrival of an audio event based on a cross-correlation of multiple audio signals, in accordance with examples of the disclosure. The operations described herein with respect to the process 300 may be performed by the vehicle computing device(s) 106, as illustrated in FIG. 1. In some examples, the operations may be performed by the direction of arrival detection component 112 of the vehicle computing device(s) 106, as discussed herein.

By way of example, the process 300 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 300. In some examples, multiple branches represent alternate implementations that may be used separately or in combination with other operations discussed herein.

At operation 302, the process may include receiving a first signal in a time domain from a first audio sensor associated with a first pair of audio sensors associated with a vehicle. At operation 304, the process may include receiving a second signal in the time domain from a second audio sensor associated with the first pair of audio sensors associated with the vehicle. The first signal and the second signal may be associated with a common audio event captured by the first audio sensor and the second audio sensor.

At operation 306, the process may include applying a Fourier transform to the first signal to generate a transformed first signal in a frequency domain. At operation 308, the process may include applying a Fourier transform to the second signal to generate a transformed second signal in the frequency domain.

At operation 310, the process may include performing pre-processing of the transformed first signal. At operation 312, the process may include performing pre-processing of the transformed second signal. In some examples, the pre-processing of the transformed first signal and the transformed second signal may include filtering out particular sound frequencies that are not of interest, extracting a signal-to-noise ratio, and assigning signals to specific frequency bins.

Figure 4A:
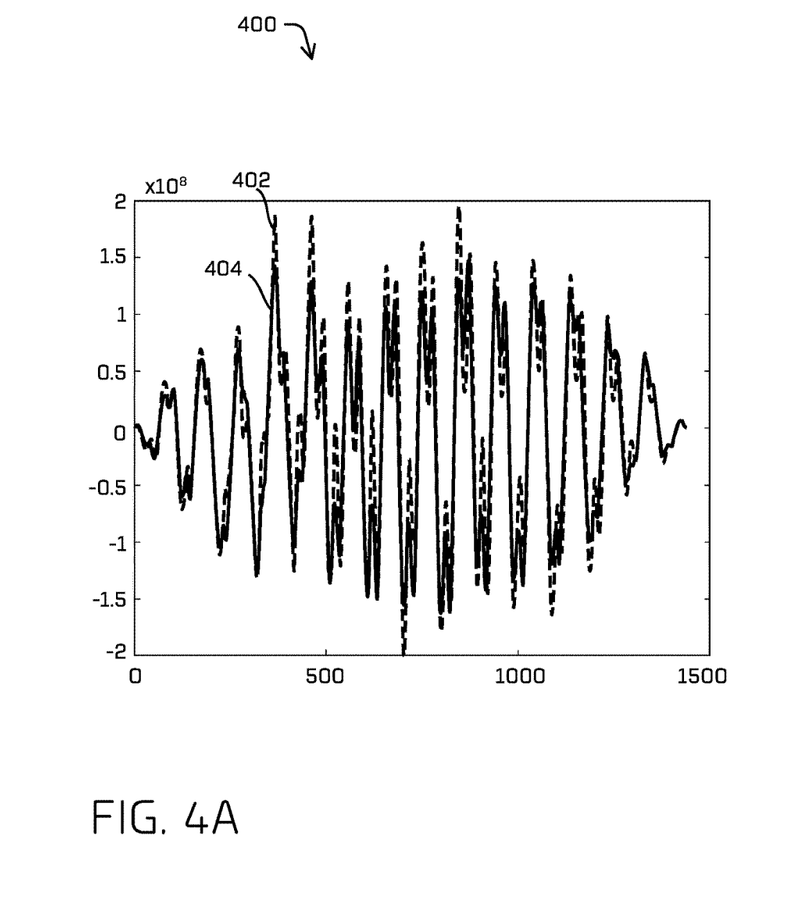
FIGS. 4A-4D illustrate example features associated with audio signals detected by multiple audio sensors, in accordance with examples of the disclosure.

At operation 314, the process may include multiplying the transformed first signal and the transformed second signal to generate a multiplied factor. At operation 316, the process may include selecting a value for a parameter (p). Additional details regarding the selection of the parameter are discussed herein (e.g., with respect to FIG. 4).

At operation 318, the process may include dividing the multiplied factor by a magnitude of the multiplied factor. In some examples, the magnitude of the multiplied factor is determined by the parameter (p), as discussed herein.

At operation 320, the process may include applying an inverse Fourier transform to the result of dividing the multiplied factor to generate a cross-correlation between the first signal and the second signal. In some examples, the cross-correlation between the first signal and the second signal is represented in the time domain.

At operation 322, the process may include determining, based at least in part on the cross-correlation data, a direction of arrival associated with the first signal and the second signal.

At operation 324, the process may include initiating an activity based at least in part on the direction of arrival. In some examples, the activity may include contacting a remote computing system (e.g., such as a remote teleoperator to request for confirmation of actions or control), changing a threshold in another perception algorithm (e.g., raising or lowering a threshold associated with a confidence level to determine that an object is an emergency object (or some other object)), initiating a vehicle maneuver (e.g., modifying a trajectory, slowing or stopping a vehicle), and the like.

In some examples, the process 300 is performed for each pair of audio sensors 108 associated with vehicle 102.

FIGS. 4A-4D illustrate example features associated with audio signals detected by multiple audio sensors, in accordance with examples of the disclosure. FIG. 4A is an illustration 400 of two audio signals 402 and 404 overlaid on each other. In some examples, the audio signals 402, 404 are capturing the same audio event using two audio sensors (e.g., microphones) spaced apart from one another. In particular implementations, the two audio sensors may be spaced apart by approximately four centimeters. In other implementations, the two audio sensors may be spaced apart by any distance.

In the example of FIG. 4A, the sound from the audio event is arriving at the two audio sensors approximately straight ahead of the axis of the audio sensors. Based on this configuration, there is minimal time offset between the two audio signals 402, 404 indicating that the audio event arrives at the audio sensors at approximately the same time.

Figure 4B:
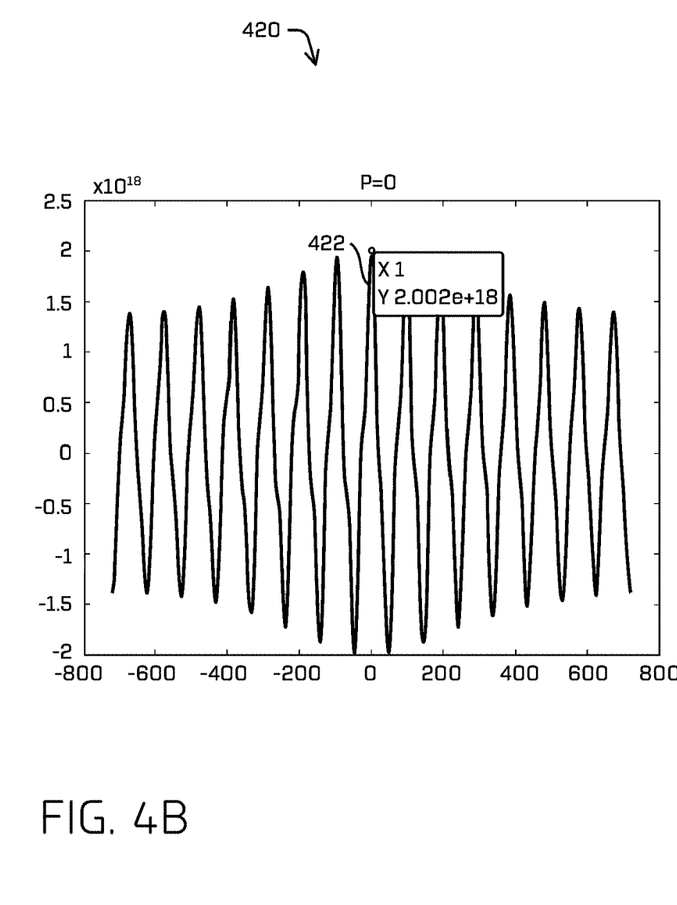

FIG. 4B is an illustration 420 of a plot 422 that represents the cross-correlation between two audio signals. The x-axis of the plot 422 represents a lag in the audio signals and the y-axis of the plot 422 represents the cross-correlation at that particular lag value. The plot 422 represents the cross-correlation with the parameter p set to 0.0 (e.g., similar to the GCC algorithm).

As shown in FIG. 4B, the plot 422 indicates a slightly stronger peak at a lag of one sample. The strongly repeating pattern of the plot 422 has a potential of erroneous lag estimate by a large margin (e.g., 100 samples, which is the period for the waveform shown in FIG. 4B). For example, if there is random noise present in the audio signals, the second most significant peak may become slightly stronger and become stronger than the primary central peak.

Figure 4C:
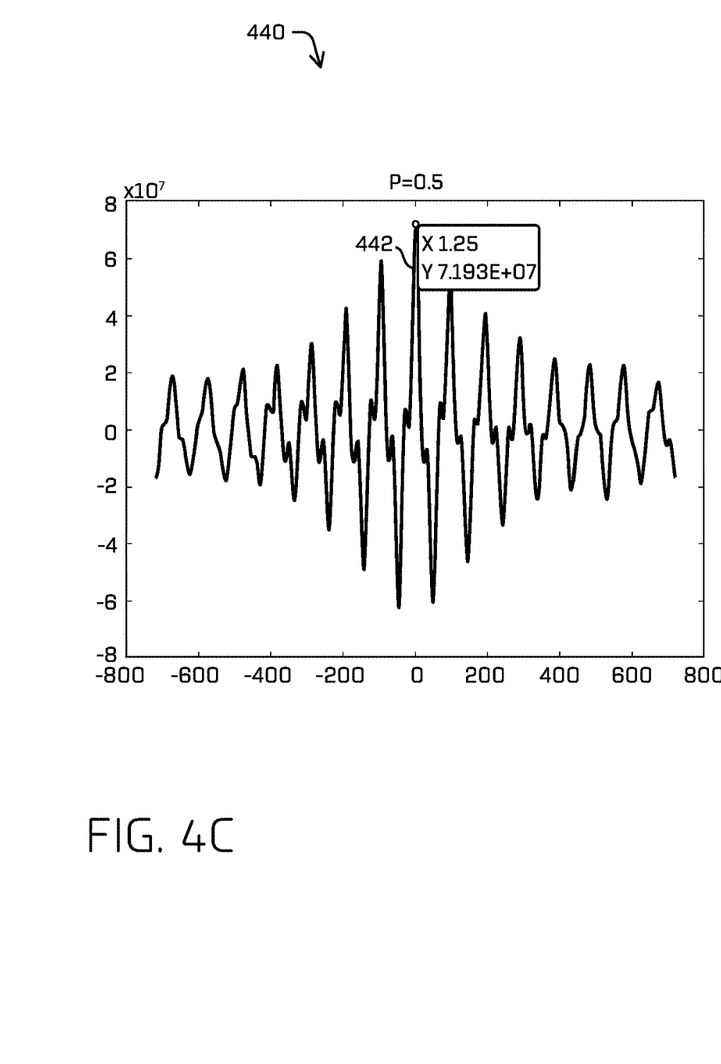

FIG. 4C is an illustration 440 of a plot 442 that represents the cross-correlation between two audio signals. The x-axis of the plot 442 represents a lag in the audio signals and the y-axis of the plot 442 represents the cross-correlation at that particular lag value. The plot 442 represents the cross-correlation with the parameter p set to 0.5 (e.g., halfway between the GCC algorithm and the GCC-PHAT algorithm).

As shown in FIG. 4C, the plot 442 indicates a significant peak at a lag of one sample. There is still a repeating pattern, but even with the existence of uncorrelated noise, it is unlikely that the uncorrelated noise would make the second most significant peak stronger than the primary central peak.

Figure 4D:
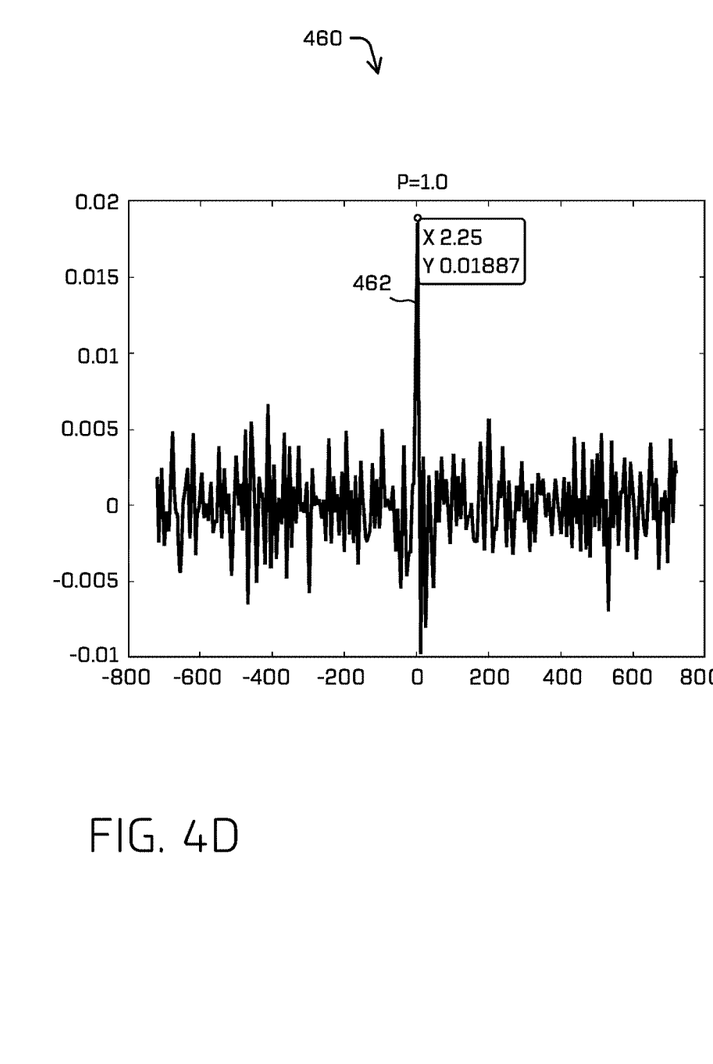

FIG. 4D is an illustration 460 of a plot 462 that represents the cross-correlation between two audio signals. The x-axis of the plot 462 represents a lag in the audio signals and the y-axis of the plot 462 represents the cross-correlation at that particular lag value. The plot 462 represents the cross-correlation with the parameter p set to 1.0 (e.g., similar to the GCC-PHAT algorithm).

As shown in FIG. 4D, the plot 462 indicates a very significant peak at a lag of one sample. This example shows that a higher value of the parameter p can sharpen the cross-correlation plot 462. In the example of FIG. 4D, there is no apparent repeating pattern. However, in some situations, the plot 462 can be disturbed by weak correlated signals at a different lag and frequency than the primary signal of interest. In these situations, a value of parameter p=1 is selected (at least initially) because it may provide optimal processing of the audio data.

Figure 5:
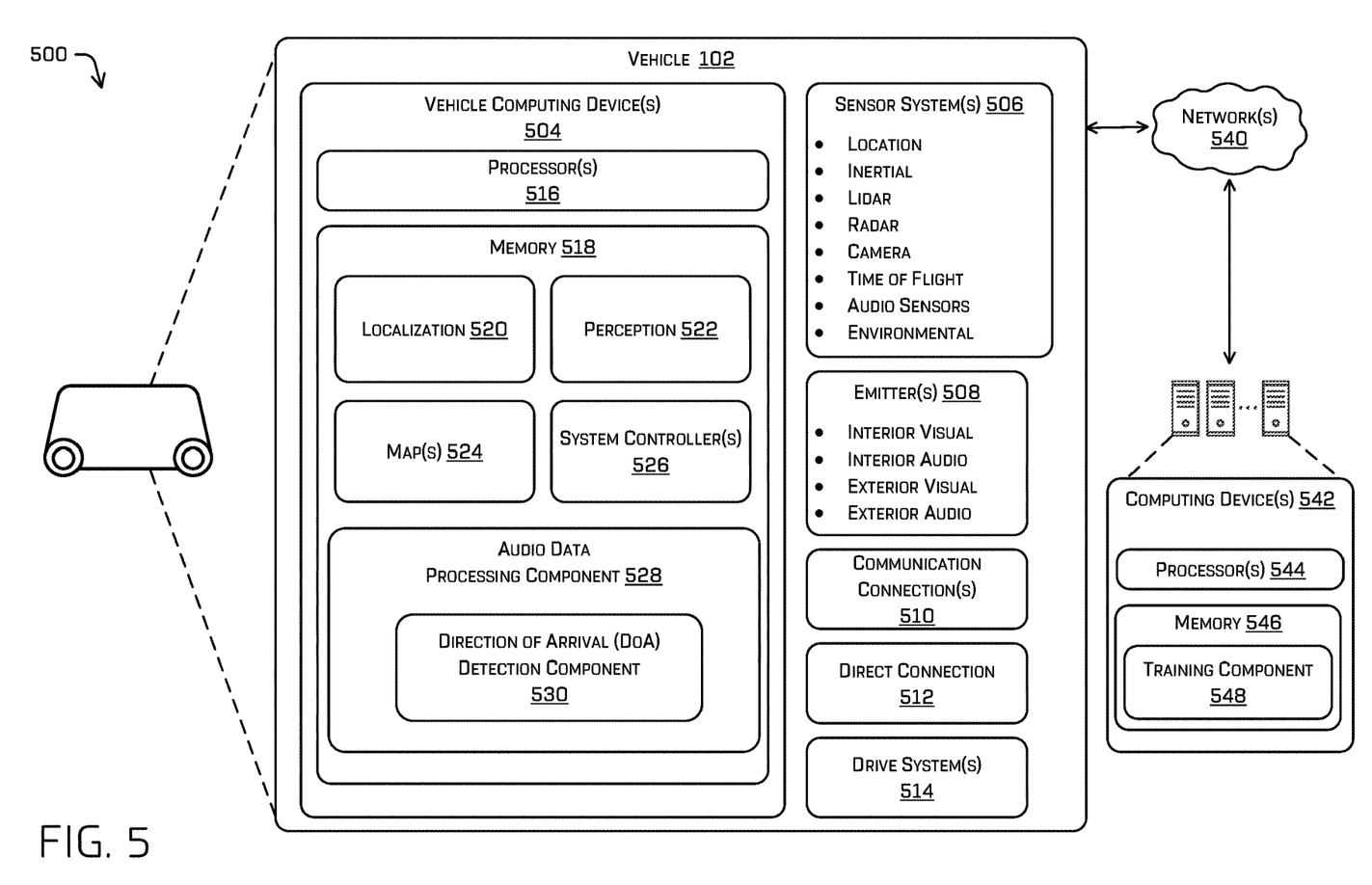
FIG. 5 is an illustration of an example system for implementing the techniques described herein.

FIG. 5 depicts a block diagram of an example system 500 for implementing the techniques described herein. The vehicle 102 may include one or more vehicle computing devices 504 (also referred to as a vehicle computing device 504 or vehicle computing device(s) 504), one or more sensor systems 506, one or more emitters 508, one or more communication connections 510, at least one direct connection 512, and one or more drive systems 514.

The vehicle computing device 504 may include one or more processors 516 and memory 518 communicatively coupled with the one or more processors 516. In the illustrated example, the vehicle 102 is an autonomous vehicle; however, the vehicle 102 could be any other type of vehicle. In the illustrated example, the memory 518 of the vehicle computing device 504 stores a localization component 520, a perception component 522, one or more maps 524, one or more system controllers 526, an audio data processing component 528 comprising at least a direction of arrival (DoA) detection component 530. Though depicted in FIG. 5 as residing in memory 518 for illustrative purposes, it is contemplated that the localization component 520, the perception component 522, the one or more maps 524, the one or more system controllers 526, the audio data processing component 528, and the direction of arrival (DoA) detection component 530 may additionally, or alternatively, be accessible to the vehicle 102 (e.g., stored remotely).

In some examples, the DoA detection component 530 can be based at least in part on a machine learned model that can output a DoA estimate and/or a confidence level associated with such an estimate.

In at least one example, the localization component 520 may include functionality to receive data from the sensor system(s) 506 to determine a position and/or orientation of the vehicle 102 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 102 to determine an initial position of an autonomous vehicle for generating a trajectory and/or for generating or receiving map data, as discussed herein.

In some instances, the perception component 522 may include functionality to perform object detection, segmentation, and/or classification. In some examples, the perception component 522 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 522 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 518 may further include one or more maps 524 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 524 may include at least one map (e.g., images and/or a mesh). In some examples, the vehicle 102 may be controlled based at least in part on the map(s) 524. In some examples, the one or more maps 524 may be stored on a remote computing device(s) (such as the computing device(s) 542) accessible via network(s) 540. In some examples, multiple maps 524 may be stored based on, for example, a characteristic (e.g., type of entity, time of day, day of week, season of the year, etc.). Storing multiple maps 524 may have similar memory requirements but increase the speed at which data in a map may be accessed.

In at least one example, the vehicle computing device 504 may include one or more system controllers 526, which may be configured to control steering, propulsion, braking, safety, emitters, communication, and other systems of the vehicle 102. These system controller(s) 526 may communicate with and/or control corresponding systems of the drive system(s) 514 and/or other components of the vehicle 102.

In some examples, the audio data processing component 528 may process the audio data received by a plurality of audio sensors associated with the vehicle 102 and determine an occurrence of an emergency and a direction of the emergency relative to the vehicle based at least in part on the audio data. Such an audio data processing component 528 may comprise a DoA detection component, as described herein (for example, the DoA detection component in FIGS. 1, 2, etc.). The direction of arrival (DoA) detection component 530 may receive the audio data collected by the audio sensor(s) in the sensor system(s) 506. to determine a direction of arrival given various pairs of sensor data as described herein.

In some instances, aspects of some or all of the components discussed herein may include any models, algorithms, and/or machine learning algorithms. For example, in some instances, the components in the memory 518 (and the memory 546, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 506 may provide input to the vehicle computing device 504. Additionally, or alternatively, the sensor system(s) 506 may send sensor data, via the one or more networks 540, to the one or more computing device(s) at a particular frequency, after a lapse of a predetermined period of time, in near real-time, etc.

The vehicle 102 may also include one or more emitters 508 for emitting light and/or sound, as described above. The emitters 508 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 510 that enable communication between the vehicle 102 and one or more other local or remote computing device(s). For instance, the communication connection(s) 510 may facilitate communication with other local computing device(s) on the vehicle 102 and/or the drive system(s) 514. Also, the communication connection(s) 510 may allow the vehicle to communicate with other nearby computing device(s) (e.g., other nearby vehicles, traffic signals, etc.). The communications connection(s) 510 also enable the vehicle 102 to communicate with a remote teleoperation computing device or other remote services.

The communications connection(s) 510 may include physical and/or logical interfaces for connecting the vehicle computing device 504 to another computing device or a network, such as network(s) 540. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 514. In some examples, the vehicle 102 may have a single drive system 514. In at least one example, if the vehicle 102 has multiple drive systems 514, individual drive systems 514 may be positioned on opposite ends of the vehicle 102 (e.g., the front and the rear, etc.). In at least one example, the drive system(s) 514 may include one or more sensor systems to detect conditions of the drive system(s) 514 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 102 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 may provide a physical interface to couple the one or more drive system(s) 514 with the body of the vehicle 102. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 102.

In some examples, the vehicle 102 may send sensor data to one or more computing device(s) 542 via the network(s) 540. In some examples, the vehicle 102 may send raw sensor data to the computing device(s) 542. In other examples, the vehicle 102 may send processed sensor data and/or representations of sensor data to the computing device(s) 542. In some examples, the vehicle 102 may send sensor data to the computing device(s) 542 at a particular frequency, after a lapse of a predetermined period of time, in near real-time, etc. In some cases, the vehicle 102 may send sensor data (raw or processed) to the computing device(s) 542 as one or more log files. The computing device(s) 542 may include processor(s) 544 and a memory 546 storing a training component 548.

In some instances, the training component 548 may include functionality to train a machine learning model to generate the DoA value associated with a detected emergency vehicle. Further, the training component 548 may include functionality to train a model to output a confidence level associated with such a DoA value, which may be used to determine a region of ambiguity, as discussed herein. For example, the training component 548 may receive a set of audio data associated with an emergency events, as well as features/parameters associated therewith. In some cases, the set of audio data may represent sounds in an environment for a period of time, such as 5 minutes, 5 hours, 1 day, 1 week, and the like. At least a portion of the set of audio data may be used as an input to train the machine learning model, and at least a portion of the set of audio data may be used as ground truth information for training the machine learning model. As a non-limiting example, a first set (e.g., 3, 4, 5, or more) of a sequence of audio data frames may be input into the machine learned model. A second set of audio data (or feature information associated therefrom—e.g., by extracting an angular spectrum, peaks of the angular spectrum and/or TDoA values at peaks from the angular spectrum, etc.) in the sequence of audio data frames immediately preceding the first set may then be used as ground truth for training the model. Thus, by providing audio data of past detected emergency vehicles in an environment, the DoA detection component may detect an occurrence of emergency vehicles and the orientation of the emergency vehicles efficiently, as discussed herein.

In some examples, the training component 548 may include training data that has been generated by a simulator. For example, simulated training data may represent examples where testing audio sources in an environment, to provide additional training examples.

The processor(s) 516 of the vehicle 102 and the processor(s) 544 of the computing device(s) 542 may be any suitable processor capable of executing instructions to process data and perform operations as described herein. By way of example and not limitation, the processor(s) 516 and 544 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 546 are examples of non-transitory computer-readable media. The memory 518 and 546 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and 546 may include at least a working memory and a storage memory. For example, the working memory may be a high-speed memory of limited capacity (e.g., cache memory) that is used for storing data to be operated on by the processor(s) 516 and 544. In some instances, the memory 518 and 546 may include a storage memory that may be a lower-speed memory of relatively large capacity that is used for long-term storage of data. In some cases, the processor(s) 516 and 544 may not operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 102 may be associated with the computing device(s) 542 and/or components of the computing device(s) 542 may be associated with the vehicle 102. That is, the vehicle 102 may perform one or more of the functions associated with the computing device(s) 542, and vice versa.

EXAMPLE CLAUSES

A. A system comprising: one or more processors; and one or more non-transitory computer-readable media storing instructions executable by the one or more processors, wherein the instructions, when executed, cause the system to perform operations comprising: receiving a first signal from a first audio sensor; receiving a second signal from a second audio sensor; determining, based at least in part on the first signal, a first transformed signal in a frequency domain; determining, based at least in part on the second signal, a second transformed signal in the frequency domain; determining, based at least in part on a characteristic associated with a vehicle and one or more of the first signal or second signal, a parameter; determining, based at least in part on the first transformed signal, second transformed signal, and the parameter, cross-correlation data; and determining, based at least in part on the cross-correlation data, a direction of arrival (DoA) value associated with the first signal and the second signal.

B. The system of paragraph A, wherein: determining the parameter is further based on one or more of: map data associated with a planned vehicle route, a vehicle configuration, environmental noise, or a time of day.

C. The system of paragraph A or B, wherein determining the parameter comprises inputting one or more of the characteristic or information associated with an environment proximate the vehicle into a machine learned model and receiving, from the machine learned model, the parameter.

D. The system of any of paragraphs A-C, wherein: determining the parameter is further based on at least one of a signal-to-noise ratio, a sparseness, or harmonics associated with the first signal and the second signal.

E. The system of any of paragraphs A-D, the operations further comprising: dynamically determining an updated value of the parameter based on changing characteristics associated with the first signal or the second signal.

F. A method comprising: receiving a first signal from a first audio sensor associated with a vehicle; receiving a second signal from a second audio sensor associated with the vehicle; determining, based at least in part on the first signal, a first transformed signal in a frequency domain; determining, based at least in part on the second signal, a second transformed signal in the frequency domain; determining, based at least in part on a characteristic associated with at least one of the vehicle or one or more of the first or second signal, a parameter; and determining, based at least in part on the first transformed signal, the second transformed signal, and the parameter, cross-correlation data.

G. The method of paragraph F, further comprising determining, based at least in part on the cross-correlation data, a direction of arrival (DoA) value associated with the first signal and the second signal.

H. The method of paragraph F or G, wherein determining the parameter is based at least in part on at least one of: a frequency sparseness of at least one of the transformed first signal or the transformed second signal; environmental noise proximate the vehicle; a window size associated with at least one of the first signal or the second signal; a fundamental frequency value associated with at least one of the first signal or the second signal; or a signal-to-noise ratio of the first and second signals.

I. The method of any of paragraphs F-H, further comprising: inputting at least one of the first signal, the second signal, the first transformed signal, or the second transformed signal into a machine learned model; and receiving, from the machine learned model, the parameter.

J. The method of any of paragraphs F-I, further comprising: initiating an activity based at least in part on a direction of arrival associated with the first signal and the second signal, wherein the activity comprises at least one of contacting a remote computing system, changing a threshold in a perception algorithm, or initiating a vehicle maneuver.

K. The method of any of paragraphs F-J, wherein determining the parameter is further based on at least one of map data associated with a planned vehicle route, a vehicle configuration, environmental noise, or a time of day.

L. The method of any of paragraphs F-K, wherein determining the parameter is further based on at least one of a signal-to-noise ratio, a sparseness, or harmonics associated with at least one of the first signal or the second signal.

M. The method of any of paragraphs F-L, further comprising dynamically determining an updated value of the parameter based on changing characteristics associated with the first signal or the second signal.

N. The method of any of paragraphs F-M, further comprising determining a first parameter associated with the first audio sensor and determining a second parameter associated with the second audio sensor.

O. The method of any of paragraphs F-N, further comprising: applying multiple values of the parameter to the first signal and the second signal simultaneously; and determining a specific parameter that produces a highest confidence level.

P. The method of paragraph O, wherein the specific parameter that produces the highest confidence level is used for processing the first signal and the second signal.

Q. One or more non-transitory computer-readable media storing instructions that, when executed, cause one or more processors to perform operations comprising: receiving a first signal from a first audio sensor associated with a vehicle; receiving a second signal from a second audio sensor associated with the vehicle; determining, based at least in part on the first signal, a first transformed signal in a frequency domain; determining, based at least in part on the second signal, a second transformed signal in the frequency domain; determining, based at least in part on a characteristic associated with at least one of the vehicle, an environment proximate the vehicle, or one or more of the first or second signal, a parameter; and determining, based at least in part on the first transformed signal, the second transformed signal, and the parameter, cross-correlation data.

R. The one or more non-transitory computer-readable media of paragraph Q, wherein the operations further comprise: determining, based at least in part on the cross-correlation data, a direction of arrival (DoA) value associated with the first signal and the second signal.

S. The one or more non-transitory computer-readable media of paragraph Q or R, wherein determining the parameter is further based on at least one of map data associated with a planned vehicle route, a vehicle configuration, environmental noise, or a time of day.

T. The one or more non-transitory computer-readable media of any of paragraphs Q-S, wherein determining the parameter is further based on at least one of a signal-to-noise ratio, a sparseness, or harmonics associated with at least one of the first signal or the second signal.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving a first signal from a first audio sensor;
   receiving a second signal from a second audio sensor;
   determining, based at least in part on the first signal, a first transformed signal in a frequency domain;
   determining, based at least in part on the second signal, a second transformed signal in the frequency domain;
   determining, based at least in part on a characteristic associated with a vehicle and one or more of the first signal or the second signal, a parameter usable to modify a cross-correlation algorithm;
   determining, based at least in part on the first transformed signal, the second transformed signal, and the parameter, cross-correlation data; and
   determining, based at least in part on the cross-correlation data, a direction of arrival (DoA) value associated with the first signal and the second signal.

2. The system of claim 1, wherein:
determining the parameter is further based on one or more of:
   map data associated with a planned vehicle route,
   a vehicle configuration,
   environmental noise, or
   a time of day.

3. The system of claim 1, wherein determining the parameter comprises inputting one or more of the characteristic or information associated with an environment proximate the vehicle into a machine learned model and receiving, from the machine learned model, the parameter.

4. The system of claim 1, wherein:
determining the parameter is further based on at least one of a signal-to-noise ratio, a sparseness, or harmonics associated with the first signal and the second signal.

5. The system of claim 1, the operations further comprising:
dynamically determining an updated value of the parameter based on changing characteristics associated with the first signal or the second signal.

6. A method comprising:
receiving a first signal from a first audio sensor associated with a vehicle;
receiving a second signal from a second audio sensor associated with the vehicle;
determining, based at least in part on the first signal, a first transformed signal in a frequency domain;
determining, based at least in part on the second signal, a second transformed signal in the frequency domain;
determining, based at least in part on a characteristic associated with at least one of the vehicle or one or more of the first or the second signal, a parameter usable to modify a cross-correlation algorithm; and
determining, based at least in part on the first transformed signal, the second transformed signal, and the parameter, cross-correlation data.

7. The method of claim 6, further comprising determining, based at least in part on the cross-correlation data, a direction of arrival (DoA) value associated with the first signal and the second signal.

8. The method of claim 6, wherein determining the parameter is based at least in part on at least one of:
a frequency sparseness of at least one of the first transformed signal or the second transformed signal;
environmental noise proximate the vehicle;
a window size associated with at least one of the first signal or the second signal;
a fundamental frequency value associated with at least one of the first signal or the second signal; or
a signal-to-noise ratio of the first and second signals.

9. The method of claim 6, further comprising:
inputting at least one of the first signal, the second signal, the first transformed signal, or the second transformed signal into a machine learned model; and
receiving, from the machine learned model, the parameter.

10. The method of claim 6, further comprising:
initiating an activity based at least in part on a direction of arrival associated with the first signal and the second signal,
wherein the activity comprises at least one of contacting a remote computing system, changing a threshold in a perception algorithm, or initiating a vehicle maneuver.

11. The method of claim 6, wherein determining the parameter is further based on at least one of map data associated with a planned vehicle route, a vehicle configuration, environmental noise, or a time of day.

12. The method of claim 6, wherein determining the parameter is further based on at least one of a signal-to-noise ratio, a sparseness, or harmonics associated with at least one of the first signal or the second signal.

13. The method of claim 6, further comprising dynamically determining an updated value of the parameter based on changing characteristics associated with the first signal or the second signal.

14. The method of claim 6, further comprising determining a first parameter associated with the first audio sensor and determining a second parameter associated with the second audio sensor.

15. The method of claim 6, further comprising:
applying multiple values of the parameter to the first signal and the second signal simultaneously; and
determining a specific parameter that produces a highest confidence level.

16. The method of claim 15, wherein the specific parameter that produces the highest confidence level is used for processing the first signal and the second signal.

17. One or more non-transitory computer-readable media storing instructions that, when executed, cause one or more processors to perform operations comprising:
receiving a first signal from a first audio sensor associated with a vehicle;
receiving a second signal from a second audio sensor associated with the vehicle;
determining, based at least in part on the first signal, a first transformed signal in a frequency domain;
determining, based at least in part on the second signal, a second transformed signal in the frequency domain;
determining, based at least in part on a characteristic associated with at least one of the vehicle, an environment proximate the vehicle, or one or more of the first signal or the second signal, a parameter usable to modify a cross-correlation algorithm; and
determining, based at least in part on the first transformed signal, the second transformed signal, and the parameter, cross-correlation data.

18. The one or more non-transitory computer-readable media of claim 17, wherein the operations further comprise:
determining, based at least in part on the cross-correlation data, a direction of arrival (DoA) value associated with the first signal and the second signal.

19. The one or more non-transitory computer-readable media of claim 17, wherein determining the parameter is further based on at least one of map data associated with a planned vehicle route, a vehicle configuration, environmental noise, or a time of day.

20. The one or more non-transitory computer-readable media of claim 17, wherein determining the parameter is further based on at least one of a signal-to-noise ratio, a sparseness, or harmonics associated with at least one of the first signal or the second signal.

21. The system of claim 1, wherein:
the parameter is a cross-correlation adjusting parameter; and
the cross-correlation data is determined by a cross-correlation determination performed with the cross-correlation adjusting parameter.

* * * * *